(12) United States Patent
Buckley

(10) Patent No.: US 12,492,689 B2
(45) Date of Patent: Dec. 9, 2025

(54) FRAC PUMP SYSTEM

(71) Applicant: Liberty Advanced Equipment Technologies LLC, Denver, CO (US)

(72) Inventor: Chris Buckley, Montgomery, TX (US)

(73) Assignee: Liberty Advanced Equipment Technologies LLC, Denver, CO (US)

(*) Notice: Subject to any disclaimer, the term of this patent is extended or adjusted under 35 U.S.C. 154(b) by 0 days.

(21) Appl. No.: 18/307,505

(22) Filed: Apr. 26, 2023

(65) Prior Publication Data

US 2023/0265839 A1   Aug. 24, 2023

Related U.S. Application Data

(63) Continuation of application No. 16/647,832, filed as application No. PCT/US2018/052755 on Sep. 25, 2018, now abandoned.

(60) Provisional application No. 62/658,139, filed on Apr. 16, 2018, provisional application No. 62/562,943, filed on Sep. 25, 2017.

(51) Int. Cl.
| | | |
|---|---|---|
| *F04B 17/03* | (2006.01) | |
| *F04B 9/02* | (2006.01) | |
| *F04B 49/06* | (2006.01) | |
| *F04B 49/20* | (2006.01) | |
| *F04B 53/08* | (2006.01) | |

(Continued)

(52) U.S. Cl.
CPC ............ *F04B 17/03* (2013.01); *F04B 9/02* (2013.01); *F04B 49/06* (2013.01); *F04B 49/20* (2013.01); *F04B 53/08* (2013.01); *F16H 1/22* (2013.01); *E21B 43/26* (2013.01)

(58) Field of Classification Search
CPC .......... F04B 49/06; F04B 49/20; F04B 17/03; F04B 53/08; F04B 29/2806; F04B 29/4813; F04B 9/02
See application file for complete search history.

(56) References Cited

U.S. PATENT DOCUMENTS 2,463,349 A * 3/1949 Baner ...................... F16H 1/22
                                                        74/421 A
2,610,992 A    9/1952 Johns et al.
(Continued)

FOREIGN PATENT DOCUMENTS

| CN | 102602322 A | 4/2014 |
|---|---|---|
| DE | 4430591 | 12/1996 |

OTHER PUBLICATIONS

Office Action issued for Canadian Patent Application No. 3,073,853, dated Nov. 8, 2021, 5 pages.
(Continued)

*Primary Examiner* — Charles G Freay
(74) *Attorney, Agent, or Firm* — Haynes and Boone, LLP; Randall C. Brown; Michael J. Tobin

(57) ABSTRACT

An electric drive pump system includes a power end and a detachable transmission assembly. The transmission assembly is mounted to the power end and is configured to provide rotational power to the power end through a plurality of electric motors. The plurality of electric motors use a gearbox to drive an output spline that engages the power end. A control module is used to regulate the performance characteristics of the plurality of electric motors. A temperature regulation assembly is configured to regulate the temperature of the transmission assembly and the power end.

2 Claims, 10 Drawing Sheets

(51) Int. Cl.
*F16H 1/22* (2006.01)
*E21B 43/26* (2006.01)

(56) References Cited

U.S. PATENT DOCUMENTS

| | | | |
|---|---|---|---|
| 3,518,897 | A | 7/1970 | Bixby |
| 4,100,822 | A * | 7/1978 | Rosman .................. B61B 12/10 |
| | | | 74/661 |
| 4,160,487 | A | 7/1979 | Kunze et al. |
| 7,901,314 | B2 | 3/2011 | Salvaire et al. |
| 8,456,045 | B2 | 6/2013 | Hayashi et al. |
| 9,599,192 | B2 * | 3/2017 | Bottcher ................. F03D 80/70 |
| 10,655,435 | B2 | 5/2020 | Oehring et al. |
| 11,208,878 | B2 | 12/2021 | Oehring et al. |
| 11,459,863 | B2 | 10/2022 | Robinson et al. |
| 2001/0012487 | A1 | 8/2001 | Takura et al. |
| 2003/0027682 | A1 | 2/2003 | Schmidt |
| 2003/0143093 | A1 | 7/2003 | Mabe et al. |
| 2012/0127820 | A1 | 5/2012 | Noles, Jr. |
| 2014/0010671 | A1 | 1/2014 | Cryer et al. |
| 2014/0161632 | A1 | 6/2014 | Cocconi |
| 2015/0078924 | A1 | 3/2015 | Zhang et al. |
| 2015/0091306 | A1 | 4/2015 | Pridgeon |
| 2015/0252661 | A1 | 9/2015 | Glass |
| 2015/0300336 | A1 | 10/2015 | Hernandez et al. |
| 2016/0032703 | A1 | 2/2016 | Broussard et al. |
| 2016/0036308 | A1 | 2/2016 | Bailey et al. |
| 2016/0177675 | A1 | 6/2016 | Morris et al. |
| 2016/0208592 | A1 | 7/2016 | Oehring |
| 2016/0258267 | A1 | 9/2016 | Payne et al. |
| 2016/0273328 | A1 | 9/2016 | Oehring |
| 2016/0362284 | A1 | 12/2016 | Haessler et al. |
| 2017/0016433 | A1 | 1/2017 | Chong et al. |
| 2017/0022788 | A1 | 1/2017 | Oehring et al. |
| 2017/0030177 | A1 | 2/2017 | Oehring et al. |
| 2017/0036178 | A1 | 2/2017 | Coli et al. |
| 2017/0051732 | A1 | 2/2017 | Hemandez et al. |
| 2017/0225559 | A1 | 8/2017 | Meuner et al. |
| 2017/0234421 | A1 | 8/2017 | Poster |
| 2017/0305736 | A1 | 10/2017 | Haile et al. |
| 2019/0249754 | A1 | 8/2019 | Oehring et al. |

OTHER PUBLICATIONS

Office Action issued for Canadian Patent Application No. 3,073,853, dated Mar. 24, 2021, 6 pages.

Office Action issued for Canadian Patent Application No. 3,079,229, dated Jul. 9, 2021, 7 pages.

Search Report and Written Opinion issued for International Patent Application No. PCT/US2018/052755, dated Dec. 4, 2018, 8 pages.

United States Patent and Trademark Office, International Search Report and Written Opinion, PCT/US2019/027702, Aug. 22, 2019, 13 pages, United States of America.

Office Action for Canadian Patent Application No. 3,179,532 issued by the Canadian Patent Office, dated Apr. 12, 2024. (4 pgs.).

Plaintiffs' Original Complaint, *U.S. Well Services, LLC et al.* vs. *Liberty Energy, Inc et al.*, Civil Action No. 4:24-cv-00839, U.S. District Court for the Southern District of Texas Houston Division, filed Mar. 6, 2024, pp. 1-22.

* cited by examiner

Example: Tick Over

| Motor # | Left Side | Right Side |
| --- | --- | --- |
| 1 | On | On |
| 2 | Off | Off |
| 3 | Off | Off |
| 4 | Off | Off |
| 5 | Off | Off |
| 6 | Off | Off |
| 7 | Off | Off |
| 8 | Off | Off |
| 9 | Off | Off |
| 10 | Off | Off |
| 11 | Off | Off |
| 12 | Off | Off |
| 13 | Off | Off |
| 14 | Off | Off |

FIG. 15

Example: 50% Required

| Motor # | Left Side | Right Side |
| --- | --- | --- |
| 1 | Off | Off |
| 2 | On | On |
| 3 | Off | Off |
| 4 | On | On |
| 5 | Off | Off |
| 6 | On | On |
| 7 | Off | Off |
| 8 | On | On |
| 9 | Off | Off |
| 10 | On | On |
| 11 | Off | Off |
| 12 | On | On |
| 13 | Off | Off |
| 14 | On | On |

FIG. 16

Example: 100% Required

| Motor # | Left Side | Right Side |
|---|---|---|
| 1 | On | On |
| 2 | On | On |
| 3 | On | On |
| 4 | On | On |
| 5 | On | On |
| 6 | On | On |
| 7 | On | On |
| 8 | On | On |
| 9 | On | On |
| 10 | On | On |
| 11 | On | On |
| 12 | On | On |
| 13 | On | On |
| 14 | On | On |

FIG. 17

Example: 70% Required

| Motor # | Left Side | Right Side |
|---|---|---|
| 1 | Off | Off |
| 2 | On | On |
| 3 | On | On |
| 4 | On | On |
| 5 | Off | Off |
| 6 | On | On |
| 7 | On | On |
| 8 | On | On |
| 9 | Off | Off |
| 10 | On | On |
| 11 | On | On |
| 12 | On | On |
| 13 | Off | Off |
| 14 | On | On |

FIG. 18

FRAC PUMP SYSTEM

RELATED APPLICATIONS

The present application is a continuation of U.S. patent application Ser. No. 16/647,832 filed Mar. 16, 2020, now abandoned, entitled "Electric Drive Pump for Well Stimulation," which claims benefit of priority under 35 U.S.C. § 371 to PCT/US2018/052755 filed Sep. 25, 2018, entitled "Electric Drive Pump for Well Stimulation," claiming benefit of priority to U.S. Provisional Patent Application Nos. 62/562,943 filed Sep. 25, 2017 and 62/658,139 filed Apr. 16, 2018, entitled "Electric Drive Pump for Well Stimulation." The disclosure of each of these applications are hereby incorporated by reference in their entirety.

BACKGROUND

Technical Field

The present application relates generally to hydraulic fracturing in oil and gas wells, and in particular to an electric drive pump used to drive a fluid end for the pumping of a fracturing fluid into a well.

DESCRIPTION OF THE RELATED ART

It is difficult to economically produce hydrocarbons from low permeability reservoir rocks. Oil and gas production rates are often boosted by hydraulic fracturing, a technique that increases rock permeability by opening channels through which hydrocarbons can flow to recovery wells. Hydraulic fracturing has been used for decades to stimulate production from conventional oil and gas wells. The practice consists of pumping fluid into a wellbore at high pressure (sometimes as high as 50,000 PSI). Inside the wellbore, large quantities of proppants are carried in suspension by the fracture fluid into the fractures. When the fluid enters the formation, it fractures, or creates fissures, in the formation. Water, as well as other fluids, and some solid proppants, are then pumped into the fissures to stimulate the release of oil and gas from the formation. When the pressure is released, the fractures partially close on the proppants, leaving channels for oil and gas to flow.

Fracturing rock in a formation requires that the fracture fluid be pumped into the well bore at very high pressure. This pumping is typically performed by large diesel-powered pumps in communication with one or more fluid ends. These specialized pumps are used to power the operation of the fluid end to deliver fracture fluids at sufficiently high rates and pressures to complete a hydraulic fracturing procedure or "frac job." Such pumps are able to pump fracturing fluid into a well bore at a high enough pressure to crack the formation, but they also have drawbacks. For example, the diesel pumps are very heavy, and thus must be moved on heavy duty trailers, making transport of the pumps between oilfield sites expensive and inefficient. In addition, the diesel engines required to drive the pumps require a relatively high level of expensive maintenance. Furthermore, the cost of diesel fuel is much higher than in the past, meaning that the cost of running the pumps has increased.

To avoid the disadvantages of diesel-powered pumps, some have moved to another option, such as electrically powered pumps. The electric frac pump configurations available now are largely comprised of existing mechanical units that are integrated into an electric system. This practice, however, can limit an operation's efficiency and performance.

Operators have at least two alternatives to choose from when in pursuit of a clean, electric power end pump. The first option offers a dual-motor configuration coupled with up to two triplex pumps. This large, industrial-sized, and air-cooled system can be capable of 3600-4500 hydraulic horsepower (HHP). The second option is a single-motor configuration. The centrally located motor is connected by two quintuplex pumps via a through-spindle design. This larger unit is also air-cooled, and is capable of 6000 HHP. Existing electric configurations experience inefficiencies in certain key areas. Contemporary offerings for electric frac configurations are composed of existing components from mechanical systems that are repurposed for electric applications. These components were not specifically built for electric systems. Consequently, effective horsepower is decreased due to design conflicts introducing hydraulic and mechanical resistance, as well as accelerated wear cycles as a result of violent harmonics and misalignments in provisional electric systems.

The inefficiencies do not end there: air-cooling solutions often leave something to be desired, as they are not capable of regulating the temperatures the motors generate, especially in environments where heat is a special concern. This leads to motors running hotter, and therefore, far less efficiently, which reduces the effective hydraulic horsepower of the entire operation. The inability to regulate running temperatures can also lead to premature failure.

There are other concerns regarding the integration of existing mechanical components and electrics, such as the optimization of the ratios used by power end reduction gears. Electric motors are often mistakenly considered to produce the same results at any RPM. Even though they have flatter and more consistent torque and power curves than internal combustion solutions, this is not entirely true. Electric motors do perform best within a certain RPM range, and contemporary offerings have not taken full advantage of the optimization that understanding provides. Reduction gear ratios that were not chosen for use in a specific electrical application, expose motors that drive them to possible premature failure, whether it be from spinning outside of the optimal range, or introducing harmonic imbalances and damaging the powertrain as a whole.

Although great strides have been made with respect to the power end of a fracturing pump system, there clearly is room left for improvement in electric drive pump fracing systems.

SUMMARY

It is an object of the present application to provide an electric drive pump system for use in well stimulation. The electric drive pump system is configured to provide a plurality of individual motors in selective configurations that work together to provide power to a power end. The motors are arranged around a gearbox which is used to convert the rotary motion of the electric motors into linear motion for operation of the plungers in the fluid ends. The system includes a transmission assembly that is composed of the gearbox and the plurality of motors. The transmission assembly is detachable from any power end, and is operable with legacy power ends.

It is a further object of the present application to include a temperature regulation system that is configured to provide means of regulating the temperature of the components within the system. The temperature regulation system can be configured to provide both a heating effect and a cooling effect depending on configurations.

Another object is to provide a control module for the monitoring and regulation of the various components. The control module may use any number of sensors to monitor operations. The motors may be regulated in their performance as well as the temperature regulation system. Communication to and from the control module may occur through wireless and/or wired means. Any number of input/output interfaces may be included to input and receive parameters and instructions.

Ultimately the invention may take many embodiments beyond the exact depiction provided herein. This system overcomes the disadvantages inherent in the prior art.

The more important features of the system have thus been outlined in order that the more detailed description that follows may be better understood and to ensure that the present contribution to the art is appreciated. Additional features of the system will be described hereinafter and will form the subject matter of the claims that follow.

Many objects of the present system will appear from the following description and appended claims, reference being made to the accompanying drawings forming a part of this specification wherein like reference characters designate corresponding parts in the several views.

Before explaining at least one embodiment of the system in detail, it is to be understood that the system is not limited in its application to the details of construction and the arrangements of the components set forth in the following description or illustrated in the drawings. The system is capable of other embodiments and of being practiced and carried out in various ways. Also it is to be understood that the phraseology and terminology employed herein are for the purpose of description and should not be As such, those skilled in the art will appreciate that the conception, upon which this disclosure is based, may readily be utilized as a basis for the designing of other structures, methods and systems for carrying out the various purposes of the present system. It is important, therefore, that the claims be regarded as including such equivalent constructions insofar as they do not depart from the spirit and scope of the present system.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

FIGS. 15-18 are charts of the operative functioning of the electric motors in various different power demand conditions.

Figure 1:
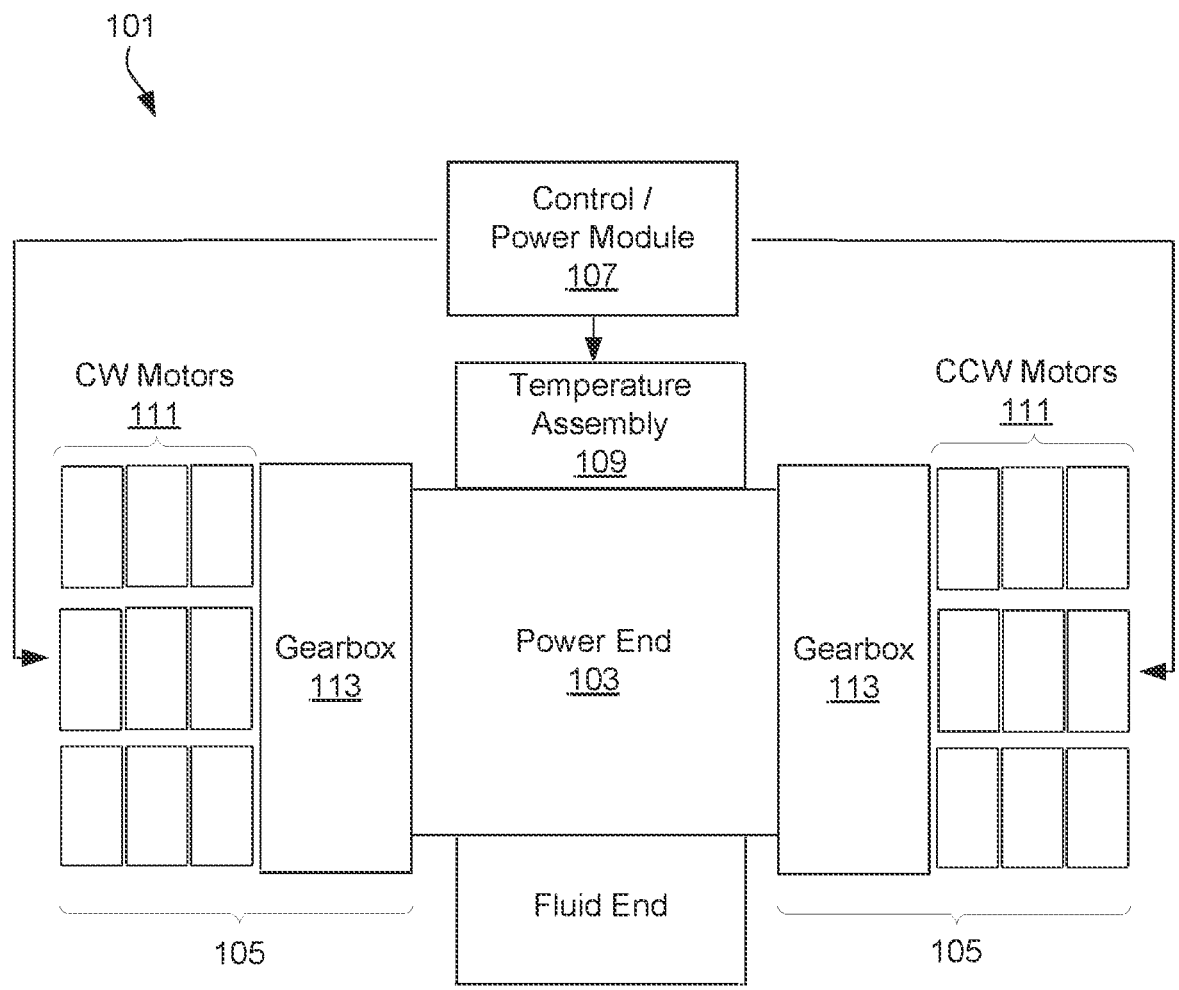
FIG. 1 is a schematic of an electric drive pump system according to an embodiment of the present application.
Figure 2:
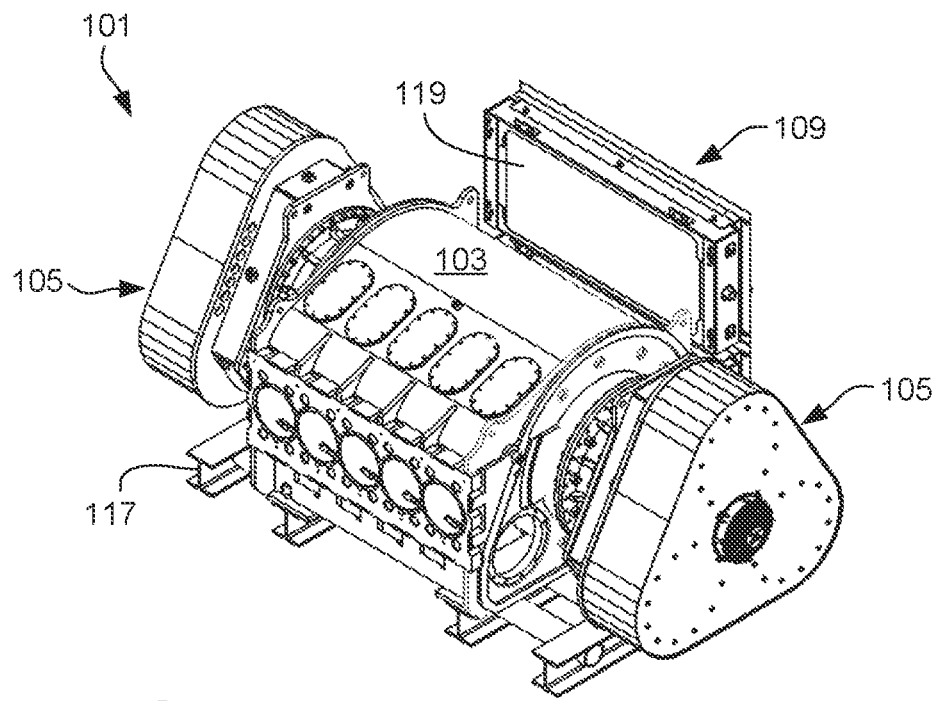
FIG. 2 is a front perspective view of an electric drive pump in the electric drive pump system of FIG. 1.
Figure 3:
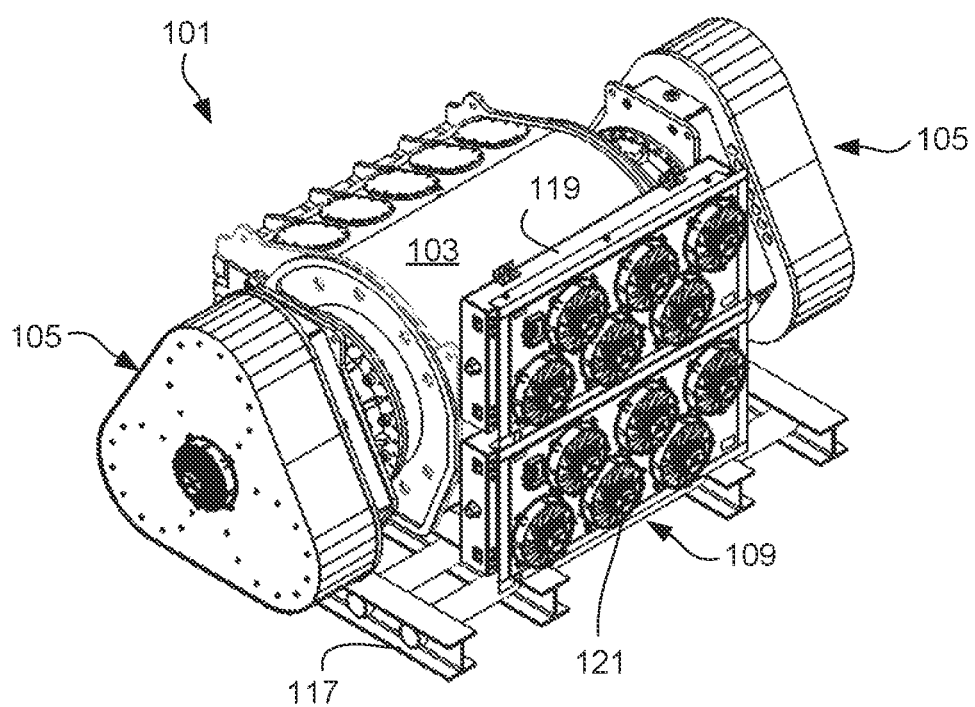
FIG. 3 is a rear perspective view of the electric drive pump of FIG. 2.

While the application is susceptible to various modifications and alternative forms, specific embodiments thereof have been shown by way of example in the drawings and are herein described in detail. It should be understood, however, that the description herein of specific embodiments is not intended to limit the application to the particular forms disclosed, but on the contrary, the intention is to cover all modifications, equivalents, and alternatives falling within the spirit and scope of the application as described herein.

DETAILED DESCRIPTION

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the assembly described herein may be oriented in any desired direction.

The system in accordance with the present application overcomes one or more problems commonly associated with conventional pumps used to stimulate a well. The electric drive pump system of the present application is configured to incorporate a plurality of electric motors to the power end or pump portion of a pump system. The motors are configured to operate either collectively or independently to vary the power supplied to the power end. The electric motors may operate in any combined manner and may operate in any sequential order. By including smaller motors, the motors are more easily obtained in the market, precise power requirements may be met smoothly, and overall power consumption may be minimized. Additionally, the electric drive pump system of the present application allows end-users to almost entirely eliminate hydrocarbon emissions by using clean-burning well gas turbines or local industrial power sources to fuel their operations. Noise pollution is also reduced by the removal of some of the loudest equipment on the pad, and electric configurations allow for cooling solutions that can be controlled to reduce or redirect most auditory nuisances. The electric drive pump system also has a smaller footprint on-pad than conventional pump systems. Maintenance is simplified to a considerable degree, since heavy, cumbersome mechanical power units are replaced with smaller, less complex electrical power units. These and other unique features of the device are discussed below and illustrated in the accompanying drawings.

The system will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The system of the present application is illustrated in the associated drawings. The assembly includes a portable base member that can roll along the ground. The base member defines an interior volume used for storage of various members and portions of the assembly. It also includes an elevating platform in communication with the base member. The elevating platform operates between a lowered position and an elevated position. The assembly is stabilized by one or more jacks and a hitch attachment assembly configured to secure the base member to the neighboring vehicle. Additional features and functions of the device are illustrated and discussed below.

Referring now to the Figures wherein like reference characters identify corresponding or similar elements in form and function throughout the several views. The following Figures describe the assembly of the present application and its associated features. With reference now to the Figures, an embodiment of the electric drive pump system is herein described. It should be noted that the articles "a", "an", and "the", as used in this specification, include plural referents unless the content clearly dictates otherwise.

Referring to FIG. 1 in the drawings, a schematic of an electric drive pump system for well stimulation through a power end is provided. The electric drive pump system 101 includes a power end 103, a transmission assembly 105, a control module 107 and a temperature regulation assembly 109. Power end 103 is configured to convert the rotational/rotary motion generated through transmission assembly 105 into a linear motion for operation of plungers within one or more fluid ends. Power end 103 may have operate with any number of fluid ends and may be constructed from a casting or fabricated from one or more materials.

Transmission assembly 105 is releasably mounted to power end 103, and includes a plurality of electric motors 111 and a gearbox 113 in communication with the plurality of electric motors. The gearbox 113 includes a plurality of gears for transferring rotational energy from the electric motors to the power end. Transmission assembly 105 also includes an output spline 115 in communication with gearbox 113. Output spline 115 is configured to transfer rotational energy from gearbox 113 to power end 103. In general, transmission assembly 105 is configured to hold the drive system (motors 111 and gearing) along with cooling components and sensors.

System 101 also includes control module 107 configured to regulate performance of the plurality of electric motors 111. Electrical power is provided to motors 111 which in turn are used to induce a torque of selected power to rotate gears within gearbox 113. Control module 107 is used to monitor each motor's performance and control selected functions, such as power output, speed, on/off, unit temperature, and so forth. It is understood that these are exemplary in nature and do not form an exhaustive listing of performance characteristics or functions that module 107 may regulate with respect to motors 111 or system 101. Through control module 107, operation of motors 111 can be done simultaneously as a group at a selected power level and/or independently wherein each motor 111 is independent of the operation of other motors 111 with respect to at least power output and runtime. Use of a plurality of motors 111 allows for simplification of maintenance as one or more motors 111 may be turned off for maintenance while others remain on to maintain operation of power end 103.

It is understood that many different types of motors 111 exist and are possible. For example, motors 111 may be AC or DC, single or multiple wound, brushed or brushless, direct drive, servo or stepper motors. Another option is that motors 111 are rare earth magnet motors which have increased power density. Motors 111 may be powered via battery stacks or direct feed from a main power grid. Additionally, motors 111 may be powered off of waste gas from the sites. Ideally a DC power system is preferred.

As seen in FIG. 1, a plurality of transmission assemblies may be coupled to drive power end 103. Motors 111 can be configured to operate in a clock-wise (CW) direction or a counter clock-wise (CCW) direction so as to collectively rotate in the same direction relative to power end 103. Also seen in FIG. 1, motors may be arranged in any manner within transmission assembly 105. One or more motor 111 may be in direct communication with gearing in gearbox 113. Subsequent or additional motors 111 used may be stacked behind an adjacent motor 111. In stacked configurations, the stacked motors 111 work together in a prescribed fashion according to control module 107 to apply power to gearbox 113 at a single location.

Temperature regulation assembly 109 is configured to regulate the temperature levels of various components and members of system 101. For example, temperature regulation assembly 109 is configured to regulate the temperature of power end 103 and/or transmission assembly 105. Module 107 is configured to operatively regulate performance of assembly 109. One or more sensors are located throughout system 101 and communicate temperature readings back to module 107 and/or assembly 109. Assembly 109 includes a radiator and a cooling fan and uses any type of working medium (i.e. fluid) to facilitate temperature regulation. Assembly 109 may use an oil based fluid or a water based fluid as the working medium.

Additionally, assembly 109 is configured to provide both a cooling effect and a heating effect. For example, to optimize the performance of system 101, assembly 109 can be used to heat critical components within system 101 to a stable operating temperature before actuation of the system as a whole. Assembly 109 then may switch to a cooling mode to cool various components while in operation so as to keep the working medium temperature optimized.

FIGS. 2-14 are provided to show an exemplary embodiment of system 101. This embodiment is not limited to the physical characteristics so depicted but can extend to other embodiments that are considered within the same functional scope and spirit of the present system.

Referring now also to FIGS. 2-5 in the drawings, views of electric drive pump system 101 is illustrated. System 101 is shown in a front perspective view in FIG. 2 and a rear perspective view in FIG. 3. Power end 103 is situated between two transmission assemblies 103. Temperature regulation assembly 109 is shown adjacent power end 103. Power end 103 and temperature regulation assembly 109 are resting on a platform 117. Platform 117 is configured to elevate system 101 off the ground and provide for the overall stability of system 101. Platform 117 is configured to enable mobility of system 101. System 101 may be lifted by engaging platform 117 in one method. Other methods may involve pushing, pulling, or sliding for example. Platform 117 may be a skid, trailer, operate off of wheels, or consist of any mobile type of device. As seen in the Figures, a plurality of fasteners are used to couple transmission assembly 105 to power end 103. Assembly 105 is detachable and interchangeable. During servicing, a single assembly 105 may be removed and replaced in a simple manner to avoid down time of the system.

Figure 4:
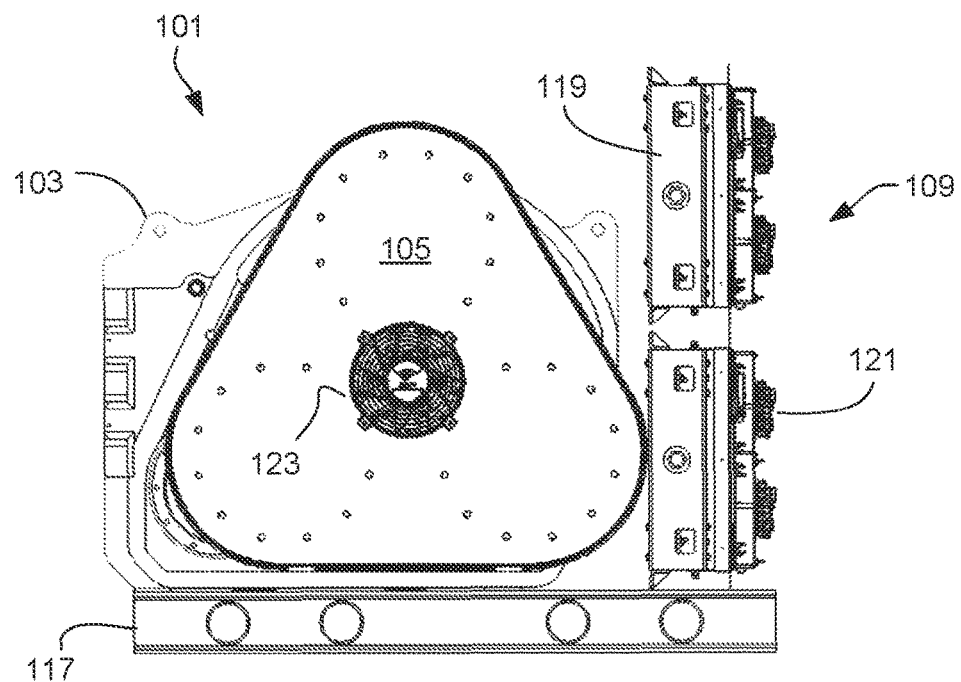
FIG. 4 is a side view of the electric drive pump of FIG. 2.
Figure 5:
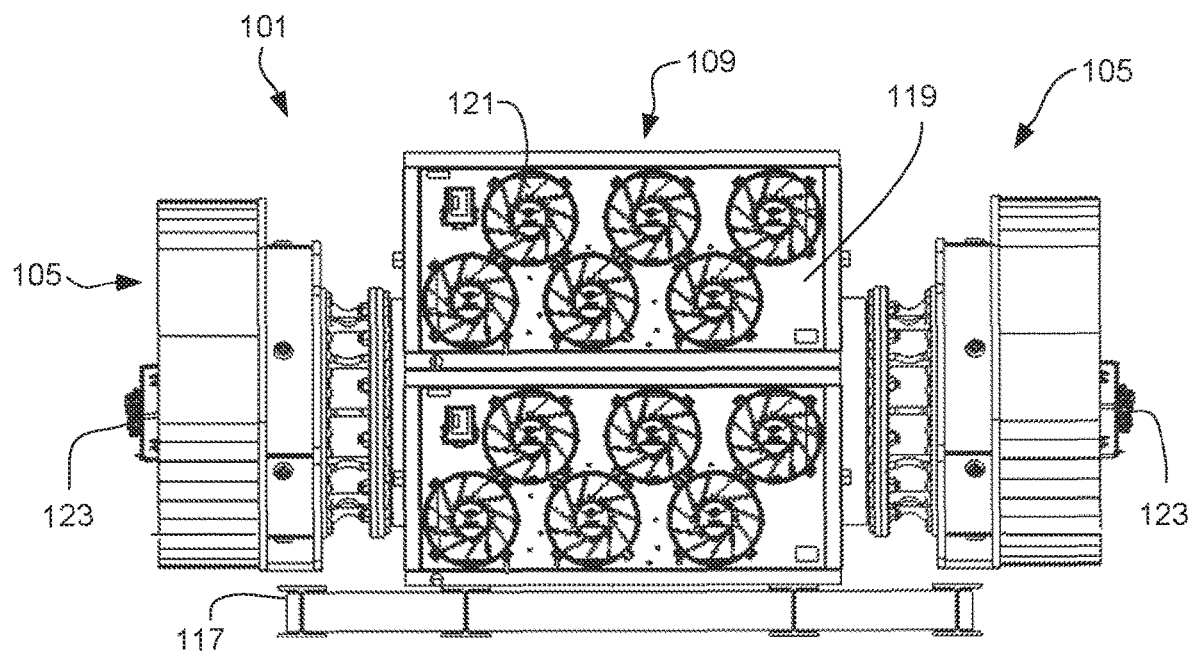
FIG. 5 is a rear view of the electric drive pump of FIG. 2.

Temperature regulation assembly 109 is shown in more detail from the side view of FIG. 4 and the rear view of FIG. 5. Assembly 109 includes a radiator 119 and a fan 121. Radiator 119 may include one or more cores with each core having the ability to cool a working medium to produce a cooling effect. This effect can be provided to motors 111, transmission assembly 105, and power end 103. Any type of working medium may be used to pass within the core of radiator 119. It is understood that multiple cores may be used. They may be stacked together in any manner. Each of the plurality of cores may be either independent from one another or in fluid communication with each other. Independent cores permit for the use of different working mediums. Use of different mediums may assist in providing both heating and cooling via the same radiator. Fan 121 is configured to pass air onto radiator 119 so as to create an exchange of heat.

It is worth noting as well that in FIGS. 4 and 5 the use of a circulation fan 123 is also seen in communication with transmission assembly 105. Fan 123 is configured to selectively pass air over motors 111 by having outside air (outside of transmission assembly 105) enter and mix within assembly 105. Fan 123 may work independent of assembly 109 or in conjunction therewith. Module 107 may be used to regulate fan 123.

Figure 6:
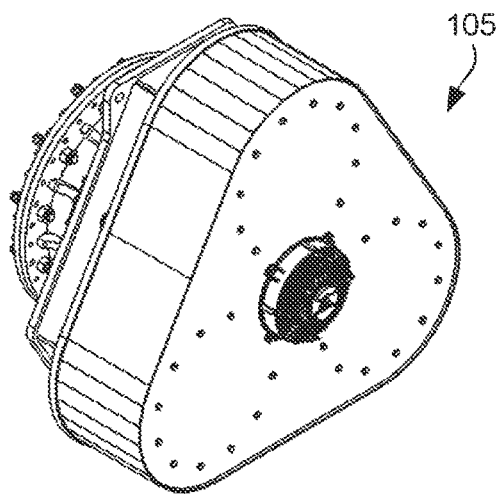
FIG. 6 is a front perspective view of a transmission assembly in the electric drive pump of FIG. 2.
Figure 7:
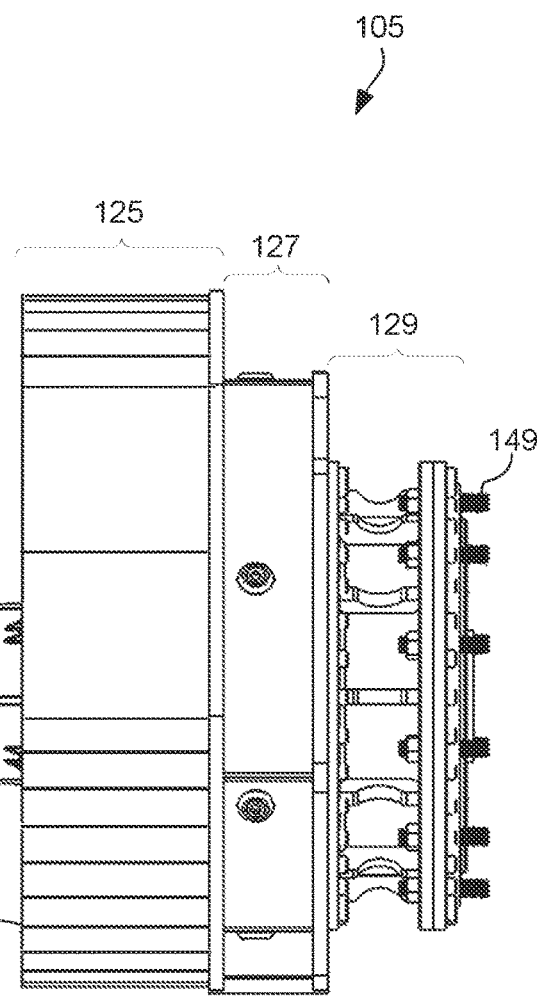
FIG. 7 is a side view of the transmission assembly of FIG. 6.
Figure 8:
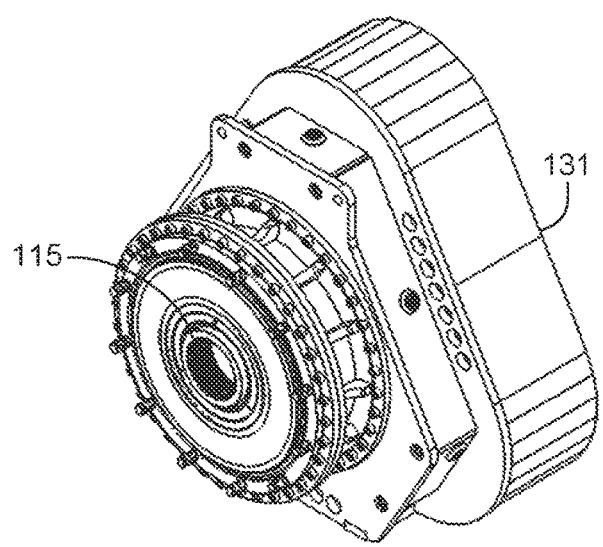
FIG. 8 is a rear perspective view of the transmission assembly of FIG. 6.

Referring now also to FIGS. 6-8 in the drawings, assorted views of transmission assembly 105 are illustrated. AS noted previously, assembly 105 is detachable from power end 103. Transmission assembly 105 is depicted herein separated therefrom as a whole unit. Transmission assembly 105 is composed of a plurality of various components and assemblies working together to provide the transfer of rotational energy to power end 103. As seen in the side view of FIG. 7, transmission assembly 105 includes a motor portion 125, a gear reduction assembly 127, and a planetary assembly 129. These general assemblies 125 and 127 are defined in their relative location in FIG. 7 and constitute gearbox 113. In the case of motor portion 125, transmission housing 131 is a cover that surrounds motors 111. In FIG. 8, output spline 115 is shown. As motors 111 rotate gearing in gearbox 113, output spline 115 rotates and drives power end 103.

Figure 9:
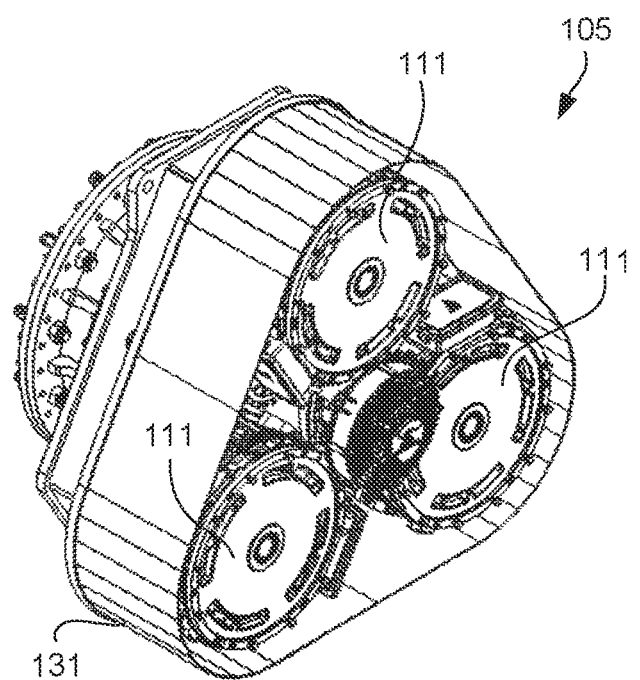
FIG. 9 is an alternate front perspective view of the transmission assembly of FIG. 6.
Figure 10:
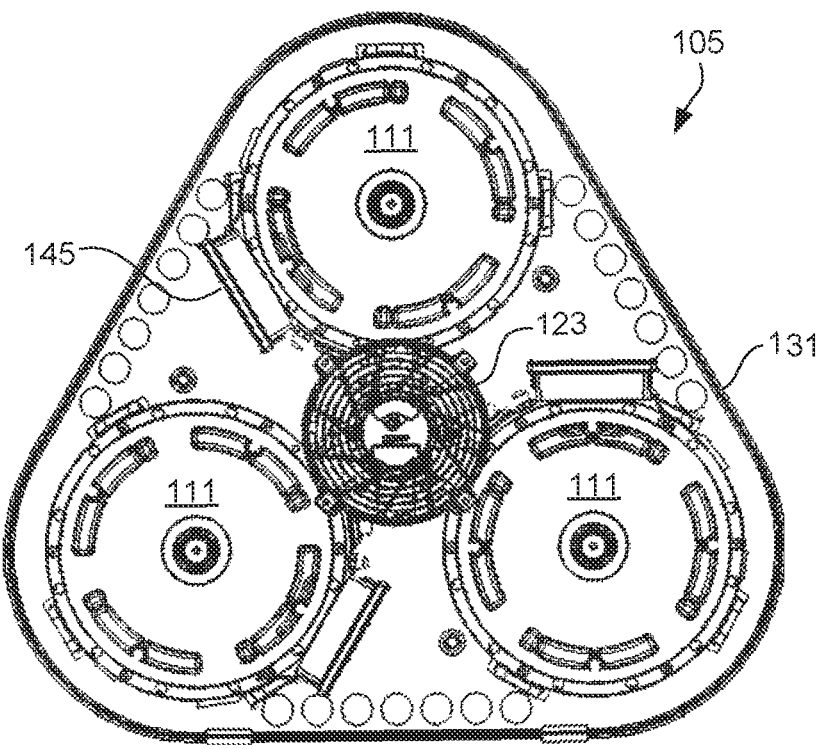
FIG. 10 is a front view of the transmission assembly of FIG. 9.

Referring now also to FIGS. 9 and 10 in the drawings, an alternate front perspective view and front view of transmission assembly 109 is illustrated. In these Figures, a portion of housing 131 is removed for clarity and to permit a view of motors 111. Motors 111 are arranged in a radial manner about output spline 115. Fan 123 has been maintained for visual purposes.

Figure 11:
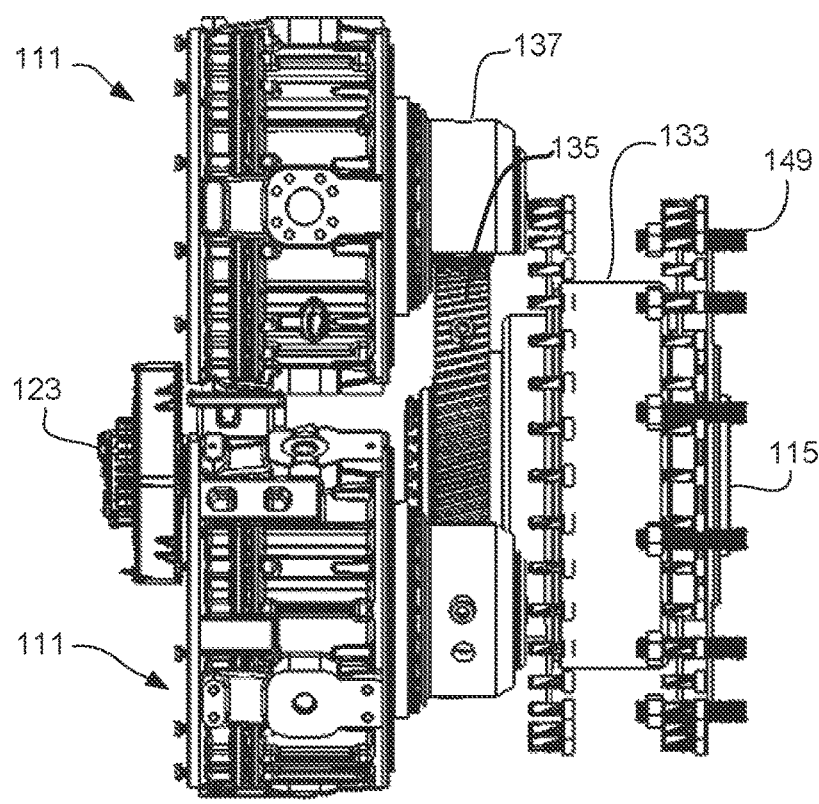
FIG. 11 is an interior side view of the transmission assembly of FIG. 9.
Figure 12:
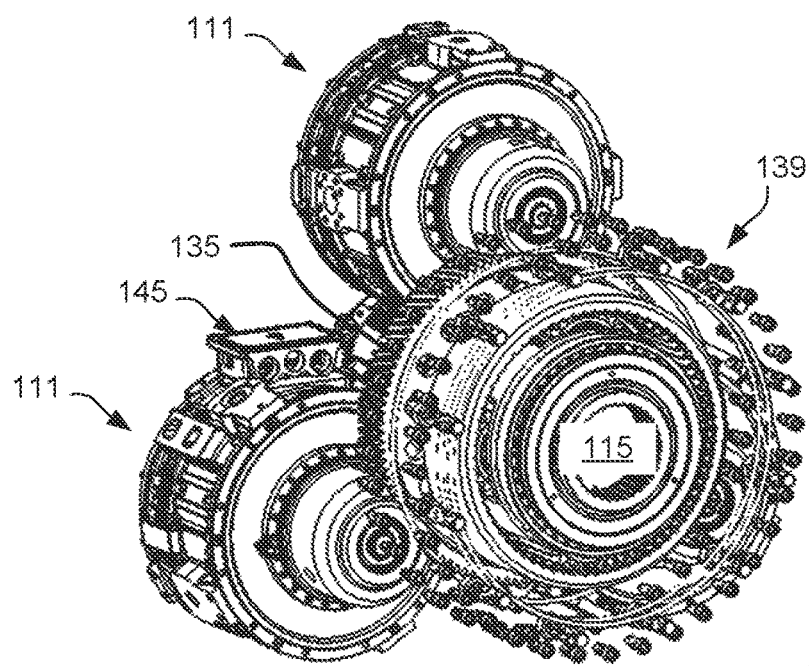
FIG. 12 is a rear perspective view of the transmission assembly of FIG. 11.

Referring now also to FIGS. 11-14 in the drawings, assorted views of the gearing in transmission assembly 105 is illustrated. FIG. 11 is an interior side view of transmission assembly 105 without housing 131 and covers associated with gearbox 113 so as to show the gearing being used. Planetary system 133 (i.e. gears), which includes sun gear 134 and internal ring gear 136 are illustrated adjacent output spline 115. A bull gear 135 is shown as being located between planetary system 133 and a spur gear arrangement 137. Power from motors 111 pass to the spur gear 137, to the bull gear, and then to the planetary system before being output through the output spline 115. A rear perspective view is shown in FIG. 12 and is provided for perspective. The gear reduction 139 is shown in more clarity.

Figure 13:
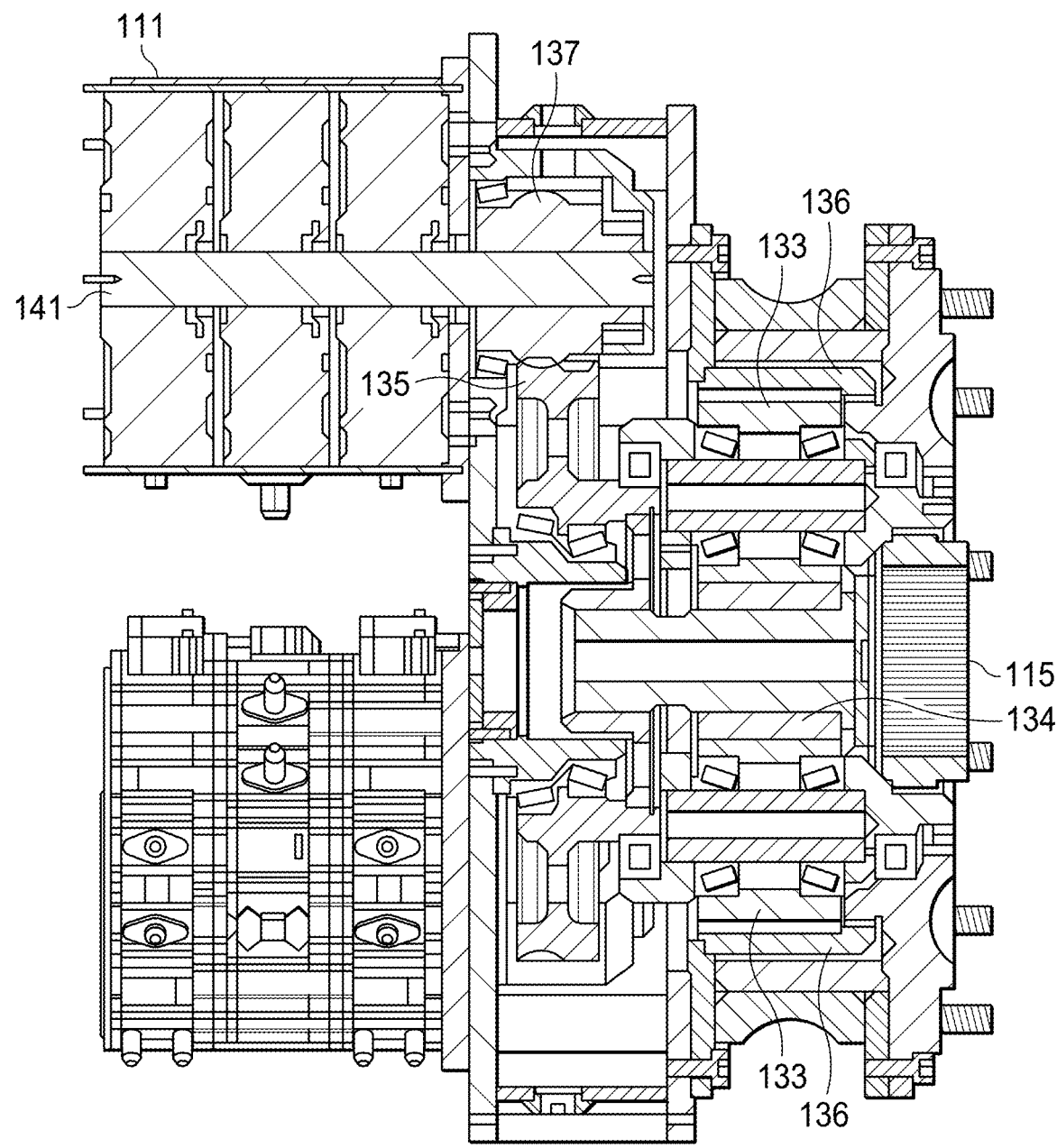
FIG. 13 is a side section view of the transmission assembly of FIG. 12.

In particular with FIG. 13 in the drawings, a side section view of transmission assembly 105, from FIG. 11, is provided. In this view, each of the prior gearing is shown from the side and serves to enhance clarity in the gearing options. Planetary system 133 is understood to be suitable for any number of configurations. Output spline 115 connects transmission assembly 105 to a crank shaft in power end 103. It is understood that this could also be facilitated through a key drive or flexible coupling arrangement. Motors 111 are shown in section view as well. A drive shaft 141 is shown passing through the central part of motors 111. Each motor engages shaft 141. Shaft 141 engages and contacts the spur gear 137. Also of note is the stacking capability of motors 111. As shown, three motors are stacked to one shaft 141.

Figure 14:
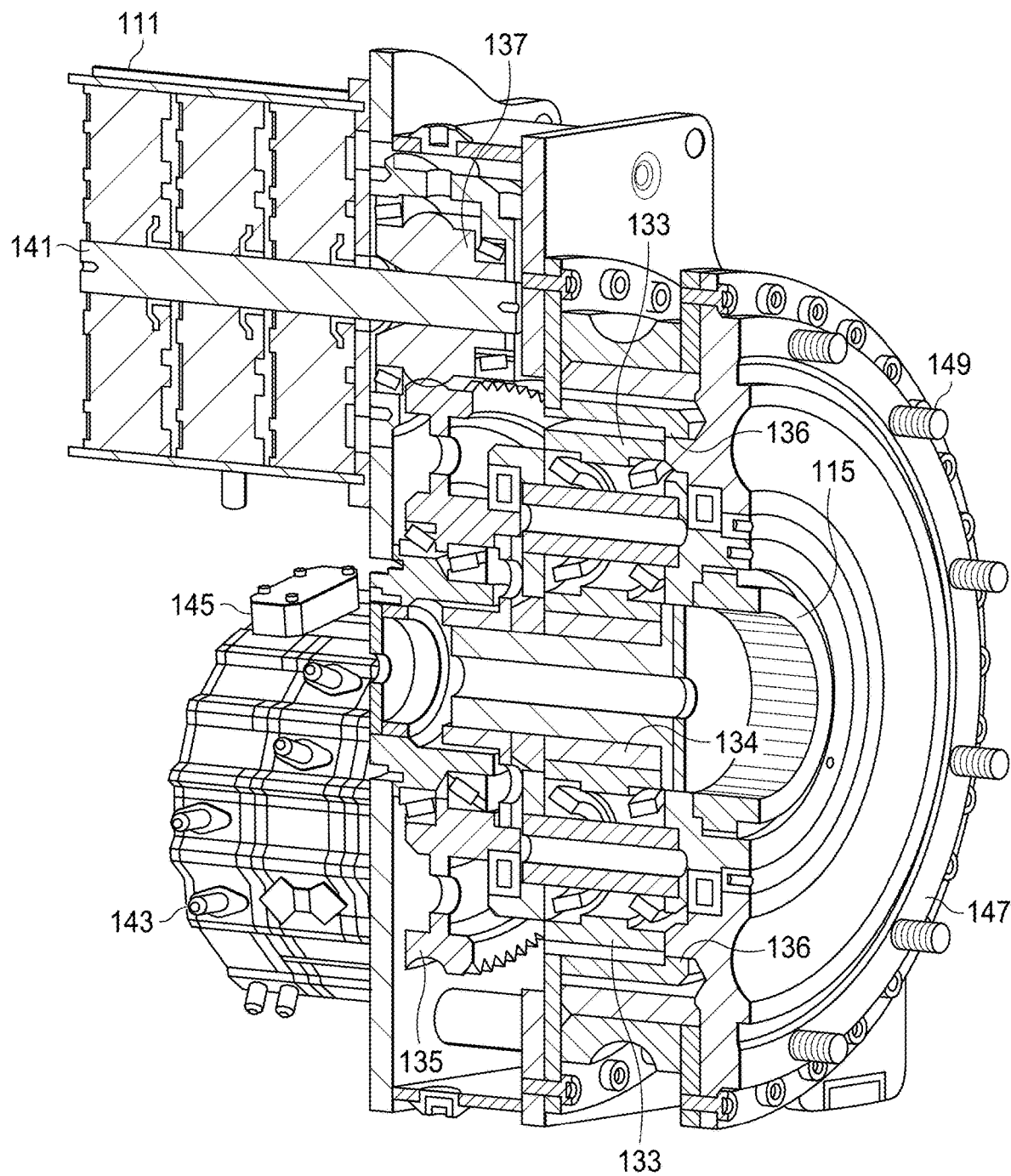
FIG. 14 is a rear perspective view of the transmission assembly of FIG. 13.

In particular with FIG. 14 in the drawings, a rear perspective view of FIG. 13 is shown for clarity. In this view, a liquid port 143 is made more visible on motor 111. Assembly 109 is able to engage motors 111 through this port to provide a cooling/heating effect. Module 107 may communicate with motors 111 through a cable entrance point 145. Additionally, a power source may also use entrance point 145 to provide power to run motors 111. A coupling flange 147 is shown as well. This is used to facilitate mating between transmission assembly 105 and power end 103. Contact with power end 103 may occur along this flange. The fasteners 149 are used to secure assembly 105 in position.

Referring now also to FIGS. 15-18 in the drawings, charts of the operative functioning of the electric motors 111 are illustrated. As noted previously, motors 111 may operate as a collective whole or independent of one another. Motors 111 can be used in a continuous duty cycle or as a sequenced duty cycle to meet the requirement of the pumps output. Each chart includes a table showing fourteen motors 111 which may be associated with a left side and a right side (the number of motors is exemplary only). Under each side a label of "on" and "off" is provided. In FIG. 15, an example of the operation of the motors 111 is provided wherein only a small amount of power is needed. In this condition, only motor #1 is turned on. The others remained off.

In FIG. 16, a 50% output is required. To produce this amount, the even numbered motors 111 are operative while the odd numbered motors 111 are deactivated or turned off. In this case, 50% power is provided by operating half the motors 111 at full capacity. In FIG. 17, 100% power is required and therefore all motors 111 are turned on. In FIG. 18, 70% power is required. In this example, motors 1, 5, 9, and 13 are off while the others are on. As seen from the exemplary charts of FIGS. 15-18, the power supplied can be adjusted by changing the number of motors 111 turned on and the respective power output through each motor.

As alluded to above, it would appear that each motor 111 is configured to operate in full output mode only. It is understood that the system of the present application may permit the motors 111 to be run at various speeds or power outputs. This could allow all the motors 111 to operate for a 50% required output, where each motor 111 is producing only ½ its max output. An advantage of varied output motors 111 would be that potentially maintenance may be provided to selected motors 111 during operation of the fluid end without the need to completely shut down operations as other motors 111 may be set to compensate for the needed load conditions. Naturally, the motors 111 may interact and operate in any number of different manners.

It is apparent that an invention with significant advantages has been described and illustrated. The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. Although the present invention is shown in a limited number of forms, it is not limited to just these forms, but is amenable to various changes and modifications without departing from the spirit thereof.

I claim:

1. In a pump system having a power end and a fluid end for use in hydraulic fracturing, the improvement comprising:
    an electric drive component adapted by a gearing arrangement to deliver power to the power end,
    the electric drive component including at least three electric motors arranged in a circular layout, and
    a control module operably configured to regulate at least one performance parameter of each of the electric motors, the at least one performance parameter being selected from speed or power;
    wherein the control module is configured for selectively deactivating at least one of the electric motors while maintaining a total power output from the at least three electric motors by increasing power output from the electric motors which have not been deactivated.

2. The pump system of claim 1, wherein the at least one performance parameter includes speed and power.

* * * * *